(12) United States Patent
Vollmann et al.

(10) Patent No.: US 7,702,872 B2
(45) Date of Patent: Apr. 20, 2010

(54) JAVA SMART CARD CHIP HAVING MEMORY AREA RESERVED FOR GLOBAL VARIABLES

(75) Inventors: Siegfried Vollmann, Puchheim (BE);
Manouchehr Hosseini, München (DE);
Monika Uminska-Ziesche, München (DE)

(73) Assignee: Giesecke & Devrient GmbH, Munich (DE)

( * ) Notice: Subject to any disclaimer, the term of this patent is extended or adjusted under 35 U.S.C. 154(b) by 738 days.

(21) Appl. No.: 10/582,118

(22) PCT Filed: Dec. 3, 2004

(86) PCT No.: PCT/EP2004/013797

§ 371 (c)(1),
(2), (4) Date: Jan. 16, 2007

(87) PCT Pub. No.: WO2005/055052

PCT Pub. Date: Jun. 16, 2005

(65) Prior Publication Data

US 2007/0168951 A1 Jul. 19, 2007

(30) Foreign Application Priority Data

Dec. 8, 2003 (DE) .................. 103 57 257

(51) Int. Cl.
*G06F 12/00* (2006.01)
(52) U.S. Cl. .................. 711/170; 711/115; 235/492
(58) Field of Classification Search .................. 235/492
See application file for complete search history.

(56) References Cited

U.S. PATENT DOCUMENTS 5,581,768 A 12/1996 Garney et al.

| 7,114,646 | B2* | 10/2006 | Hillhouse | 235/375 |
|---|---|---|---|---|
| 7,131,121 | B2* | 10/2006 | Krishna et al. | 717/165 |
| 7,165,246 | B2* | 1/2007 | de Jong | 717/166 |
| 7,222,331 | B2* | 5/2007 | de Jong | 717/106 |
| 7,272,839 | B2* | 9/2007 | Moribe et al. | 720/677 |
| 7,281,237 | B2* | 10/2007 | de Jong | 717/126 |

(Continued)

FOREIGN PATENT DOCUMENTS

DE 102 02 032 A1 7/2003

(Continued)

OTHER PUBLICATIONS

Shaylor N et al, "A Java Virtual Machine Architecture for Very Small Devices," Proceedings of ACM Sigplan. Workshop on Languages, Compilers and Tools for Embedded Systems, Jun. 11, 2003, pp. 1-8, XP002338016, Mountain View, CA.

(Continued)

*Primary Examiner*—Jack A Lane
(74) *Attorney, Agent, or Firm*—Bacon & Thomas, PLLC

(57) ABSTRACT

The invention provides a smart card chip having a nonvolatile system memory (ROM, flash1), a Java Card Virtual Machine implemented in the nonvolatile system memory (ROM, flash1), a nonvolatile application memory (EEPROM, flash2), a volatile working memory (RAM) and a variables memory area reserved for global variables, wherein the variables memory area is reserved in the volatile working memory (RAM). The variables memory area is preferably reserved statically. The use of the variables can be limited to system packages and optionally additionally to preloaded (ROM/EEPROM) packages.

12 Claims, 1 Drawing Sheet

U.S. PATENT DOCUMENTS

| | | | |
|---|---|---|---|
| 7,281,244 B2 * | 10/2007 | de Jong | 717/168 |
| 7,467,376 B2 * | 12/2008 | Le Metayer et al. | 717/143 |
| 7,478,367 B2 * | 1/2009 | Morgan et al. | 717/124 |
| 7,484,095 B2 * | 1/2009 | de Jong | 713/170 |
| 7,506,175 B2 * | 3/2009 | Baentsch et al. | 713/187 |
| 2002/0093856 A1 | 7/2002 | Baentsch et al. | |
| 2007/0168313 A1 * | 7/2007 | Leroy et al. | 707/1 |

FOREIGN PATENT DOCUMENTS

| | | |
|---|---|---|
| JP | 2003323597 A * | 11/2003 |
| WO | WO 98/19237 | 5/1998 |
| WO | WO 98/43212 | 10/1998 |
| WO | WO 00/46667 | 8/2000 |
| WO | WO 03/104974 A2 | 4/2003 |

OTHER PUBLICATIONS

Anonymous, "Runtime Environment Specification, Java Card Platform, Version 2.2.1," Internet Article, Oct. 2003, p. 23, XP002371505, Santa Clara, CA.

* cited by examiner

JAVA SMART CARD CHIP HAVING MEMORY AREA RESERVED FOR GLOBAL VARIABLES

FIELD OF THE INVENTION

This invention relates to a smart card chip having a Java Card Virtual Machine and a memory area reserved for global variables. The invention further relates to a module and a smart card having such a chip and to a method for implementing a Java program code, in particular Java package, in such a smart card chip.

BACKGROUND

Smart cards, i.e. chip cards with a microprocessor, are already used today, and will most likely be used increasingly in future, in a multiplicity of applications, for example in mobile devices such as mobile telephones as SIM cards or USIM cards, as bank cards or electronic purses in electronic payment transactions, as health cards for holders of health insurance (patient card) and doctors (doctor card), as citizen cards, or as multiapplication cards in which a plurality of the stated, or other, functionalities are implemented.

A smart card chip has a plurality of memory areas, namely nonvolatile, only once writable ROM, nonvolatile, rewritable EEPROM and volatile, rewritable RAM. Alternatively, parts of ROM and/or EEPROM can be replaced by flash memories.

In the production of the smart card chip, the chip manufacturer first implements in ROM a program code part called a ROM mask, which primarily contains the operating system. Then, as a rule the smart card manufacturer, which obtains the chip with the implemented ROM mask from the chip manufacturer, performs the completion of the smart card, during which additions to the operating system and applications of the smart card manufacturer are implemented in EEPROM. After completion, the smart card chip is ready to be issued to the customer.

Object-oriented programming languages, in particular Java™ from Sun Microsystems Inc., are very well suited for creating platform-independent and mutually well protected applications. However, the runtime environments of object-oriented programming languages such as Java™ are as a rule too extensive to be readily implemented in a smart card chip.

The Java Card™ technology of Sun Microsystems Inc., which is set forth e.g. in the current—and constantly updated—version in the document "Java Card™ 2.2 Runtime Environment (JCRE) Specification" (currently available under http://java.sun.com/products/javacard), is a modified Java technology for runtime environments with limited system resources which is also suitable for smart cards.

The runtime environment provided in the Java Card (more precisely, in the chip) according to the JCRE specification comprises at least the Java Card Virtual Machine (JCVM) and the Java Card Application Programming Interface (API) classes, and optionally further components. In connection with the invention the Virtual Machine of the Java Card or Java Card Virtual Machine (in the narrower sense) is understood to be the on-card part of the Java Card Virtual Machine (in the broader sense). The term Virtual Machine (VM) is thus understood in the narrower sense and equated with the on-card part of the VM provided on the Java Card. Besides the on-card part, an off-card part of the VM in the broader sense can additionally be provided.

A created program source code of a predetermined program, e.g. a program to be loaded onto a Java Card™, is, in the Java Card™ technology, as in the Java™ technology, first compiled by means of a compiler so as to produce a class file which has the format of an intermediate code, namely the Java bytecode, which is interpretable by the Java Card Virtual Machine. Then, in the Java Card™ technology, as opposed to the Java™ technology, the bytecode of the class file is additionally converted by means of a converter into a converted bytecode in a CAP file (CAP=Card Application Protocol). Compiling and conversion is done outside the Java Card, "off-card". The CAP file, and thus ultimately the predetermined program, is loaded onto the Java Card, and the bytecode of the CAP file is linked. Upon linking, access options of the program loaded onto the Java Card with the CAP file to other program code elements present in the Java Card are set up, among other things, i.e. connections between the individual packages are produced. In linking, the off-card linker must be distinguished from the on-card linker. The on-card linker is implemented in the Java Card (in the chip) and is operable without further components. The off-card linker requires for linking an export file which contains information for linking and which is not also loaded into the Java Card (the chip). The Java Card Virtual Machine finally interprets the converted and linked bytecode of the CAP files and executes it.

As a rule, Java program code is stored in the form of packages. Each package contains a part of the program code, e.g. data or one or more individual programs. The individual programs system can be either system functions of the operating system (in compiled form: system classes) or applications. The structuring of the program code into packages is also retained in the converted CAP file.

In the CAP file, each package contains not only the actual program code but additionally an import component and an export component.

The import component specifies what access options the package requires to other packages, e.g. what methods from other packages the package wants to use. The required access options are stated in the import component for example by a reference "import<other package>". Such an "import<...>" reference, which is formally a name reference (reference directed to a name, e.g. to "other package"), is converted during production of the CAP file as a rule into a so-called token, which is formally a number reference (reference directed to a number).

The export component specifies what access options the package offers other packages, e.g. what methods the package makes available to other packages for use. The access options made available are obtained in the export component for example by stating an address, the address stating the memory location of the program code made available.

That a package newly loaded into a Java Card can actually access a predetermined other package and use its program code is set up by linking. During linking, the newly loaded package loads link information (e.g. an address) from the export component of the other package into its own import component. For example, a token, i.e. a number reference produced from an "import" reference, in the import component of the new package is replaced during linking by an address from the export component of the other package. This causes the token (the reference) with the desire for use to be replaced by an actual address link between the two packages. The link and thus the actual possibility of use can only be set up if the newly loaded package has available the export component of the other package whose program code the new package wants to use.

The export components of all packages implemented in a Java Card, or a predetermined subset of all said export components, are combined in the export file. If an additional (new) package is loaded into the Java Card before completion of the Java Card, it is linked using the off-card linker and the export file. After completion of the Java Card, only the on-card linker can be used for linking.

Applications are implemented in the Java Card as a rule in the form of applets, the applets being in turn grouped into application packages. Application packages include so-called preloaded packages (preissuance packages), which are implemented in the smart card chip before or during completion, and which are implemented as a rule by the smart card manufacturer. Further, there are postloaded packages (postissuance packages), which are loaded into the smart card chip after completion, as a rule by the buyer or customer, for example a credit institution or an agency.

The contents (e.g. applets or system functions) of different packages are mutually protected by firewalls, whereas the contents (applets, etc.) within one and the same package are not mutually protected by means of firewalls.

Java makes available a number of different types of variables. There are e.g. a number of non-global, dynamically produced variables restricted to their context, e.g. instance variables or (synonymously) object variables, local variables and method parameters. Instance variables, local variables, method parameters have in common that they are produced dynamically during the runtime of a program with the object (=instance of a class), the flow (e.g. program loop), the method, etc., to which they belong, and only exist as long as the object, flow or method exists, i.e. they are transient. Moreover, they are not global, i.e. they are only usable within the context (i.e. within the object, flow or method) in or with which they have been produced. Beyond the context, the firewall prevents the variables from being used, i.e. access to the variables from outside the context is prevented by the firewall.

The memory area reserved for instance variables is located on the heap memory, in nonvolatile EEPROM (or alternatively in the flash memory). The memory area reserved for local variables is located on the stack memory, in RAM, and has only a short lifetime, namely the duration of the method execution.

The disadvantage of non-global variables is that they are not usable outside their context.

Besides the above-mentioned variables there are, as the only global (see below) variables in Java, the class variables or static variables, which are statically produced variables.

Class variables (synonymously used term: static variables) are global variables, i.e. they are not bound to single instances of a class (=single objects). Class variables are statically declared, the memory area reserved for class variables being located in EEPROM, i.e. in a nonvolatile memory area of the Java Card.

Write accesses to EEPROM are slow and therefore very time-consuming. For this reason, the access to class variables is slow, so that the performance of a program using class variables is low. Secondly, EEPROM allows only a maximum number of typically 100,000 write cycles, so that it is desirable to avoid write accesses to EEPROM wherever possible. The use of class variables, in particular in cases when only a short lifetime of the variables is required, thus slows down the performance of the program flow and stresses EEPROM by the write processes involved.

On the other hand, there is a need to use variables globally, i.e. independently of the context of a specific object, package, method, etc., for example for exchanging variables between different contexts (objects, packages, methods), etc. At present, this possibility is given only by class variables, which have the above-mentioned disadvantages such as strong stress on EEPROM and slowness.

It is therefore the problem of the invention to provide a smart card chip with a Java Card Virtual Machine and a memory area reserved for global variables which permits an access to the global variables that is simple, fast and gentle on the chip.

The smart card chip has a variables memory area reserved for global variables which is reserved in the volatile working memory, for example in RAM. Accesses to the volatile working memory are fast, and the use of the volatile working memory moreover spares the nonvolatile application memory, in particular EEPROM or a flash memory. Thus, the chip permits an access to the global variables that is simple, fast and gentle on the chip.

Therefore, there is provided a smart card chip with a Java Card Virtual Machine and a memory area reserved for global variables which permits an access to the global variables that is simple, fast and gentle on the chip.

The invention is well suited in particular for application cases for global variables in which the variables must be global, e.g. because they must be available beyond context limits, but which do not require a long lifetime of the variables. For the (fast) RAM memory in which the memory area is reserved for the variables and in which the variables are created when required is volatile. Consequently, the created variables are deleted as soon as the energy supply of the RAM memory is interrupted.

Preferably, the variables memory area is reserved statically, for example by the variables memory area being reserved for class variables (a synonym being "static type variables"), since access to the variables is particularly fast with static reservation. Access (read access or write access) to the statically reserved variables memory area means that a statically reserved variable (static type variable) is used (read or overwritten). Since no firewall check is performed when using statically reserved variables, static reservation of the variables memory area has the additional advantage that access to the variables is faster than if the variables memory area were reserved dynamically, during the runtime of the program. Consequently, it is particularly preferable that the variables memory area is reserved statically.

Further, it is preferred that those programs can access the variables memory area that can link to the variables memory area. Further preferably, the ability of a program to link to the variables memory area is obtained by making available to the program for linking an export component on the smart card chip. The variables memory area appears to a program wanting to access it to be an external program. Therefore, the program wanting to access the variables memory area needs the export information of the external program that has created the variables memory area. Preferably, a program wanting to use the reserved variables memory area thus has available, for linking, the export component of an external program that has created the variables memory area.

Further, those programs are preferably excluded from using the variables memory area that cannot link to the variables memory area. The inability of a program to link to the variables memory area is preferably obtained by an export component of the smart card chip being withheld from the program for linking.

Further preferably, the variables memory area is reserved by a corresponding Java package being stored in a system memory of the chip, said package preferably containing only the reservation of the variables memory area. Such a Java package with the name e.g.

"com.gieseckedevrient.javacard.os.commonram", which reserves memory space for a plurality of static variables "myRamVarA", "myRamVarB", etc., of the data types short and byte and int, can have for example the following form:

package com.gieseckedevrient.javacard.os.commonram;
    static short myRamVarA;
    static short myRamVarB;
      etc.

The Java package is stored in the system memory (ROM, optionally also flash memory). Upon later use of the Java package, the corresponding data, i.e. the static, global variables of the types short, byte, int are stored in RAM.

Further, it is preferred that only programs stored in the system memory (ROM, flash) can access the variables memory area. Alternatively or additionally, only programs that have been implemented in the smart card chip up to the end of completion of the smart card chip can preferably access the variables memory area.

According to a preferred embodiment, the export component is made available for linking only for packages that are implemented up to completion. A loaded package that is implemented up to completion is preferably linked with the off-card linker and the export file. Thus, the link information for linking to the variables memory area is loaded from the export component of the Java package that reserves the variables memory area into the import component of the loaded package. The result is that the loaded package can access the reserved variables memory area and can use the RAM variables there, in RAM. Packages that are implemented in the Java Card or the chip after completion do not have in their import components the link information from the export component of the Java package that has reserved the variables memory area. Therefore, packages implemented after completion cannot use the inventive RAM variables according to the preferred embodiment, i.e. not access the reserved variables memory area in RAM.

The Java Card Virtual Machine is preferably so formed, and when required modified compared to the Java Card Virtual Machine according to the Java Card VM specification, that it permits the use of global variables in the volatile working memory (RAM) on the basis of the variables memory area reserved in RAM.

In particular, the commands "getstatic" and "putstatic" of the Java Card Virtual Machine are modified compared to the commands "get static" and "putstatic" of the Java Card Virtual Machine according to the Java Card VM specification when required.

Preferably, the modifications or changes performed on the Java Card Virtual Machine when required are carried out in such a way that the modifications/changes are not qualitatively recognizable externally during use of the VM. That the modifications are not qualitatively recognizable means in particular that the smart card chip meets a predetermined Java Card specification that the chip would likewise meet without the modifications. Quantitatively, the modifications can optionally be recognizable externally, e.g. it can be recognizable externally that using the inventive global RAM variables is faster than using known global variables from the prior art. In particular, the changes performed on the commands "getstatic" and "putstatic" when required are preferably done in such a way that the use (e.g. creation, changing variable value) of static variables using the commands "getstatic" and "putstatic" is unchanged over the use (e.g. creation, changing variable value) of static variables according to the Java Card VM specification.

That the changes are not qualitatively recognizable externally is achieved for example by reserving a variables memory area for global variables in RAM, using for the reservation a variables declaration that otherwise meets the Java Card VM specification, for example a declaration of static variables, the only difference being that the static area is provided in RAM instead of in EEPROM.

Meeting of the specifications is preferably further guaranteed to the effect that a normal user cannot use the reserved variables memory area, i.e. cannot use any inventive RAM variables, since he lacks the link information because the export file required for linking is withheld from him. For example, the export file is stored with the manufacturer of the smart card and kept secret from both users and buyers of smart cards. Preferably, only program developers of system programs (and optionally of preloaded packages additionally) that are linked before completion can use the inventive RAM variables, since only these program developers of system programs (and optionally preloaded packages) have available the secret export file and thus the link information required for linking to the reserved variables memory area. Only program developers of system programs (and optionally preloaded packages) are thus excepted from the general secrecy of the export file. Buyers of smart cards who load programs (e.g. applications) into the smart card (or smart card chip) after completion of the smart card can use for linking only the on-card linker, however, which does not have the link information for linking to the reserved variables memory area in RAM.

DESCRIPTION OF DRAWINGS

The invention will hereinafter be explained more closely on the basis of embodiments and with reference to the single FIG. 1 of the drawing.

DETAILED DESCRIPTION

Figure 1:
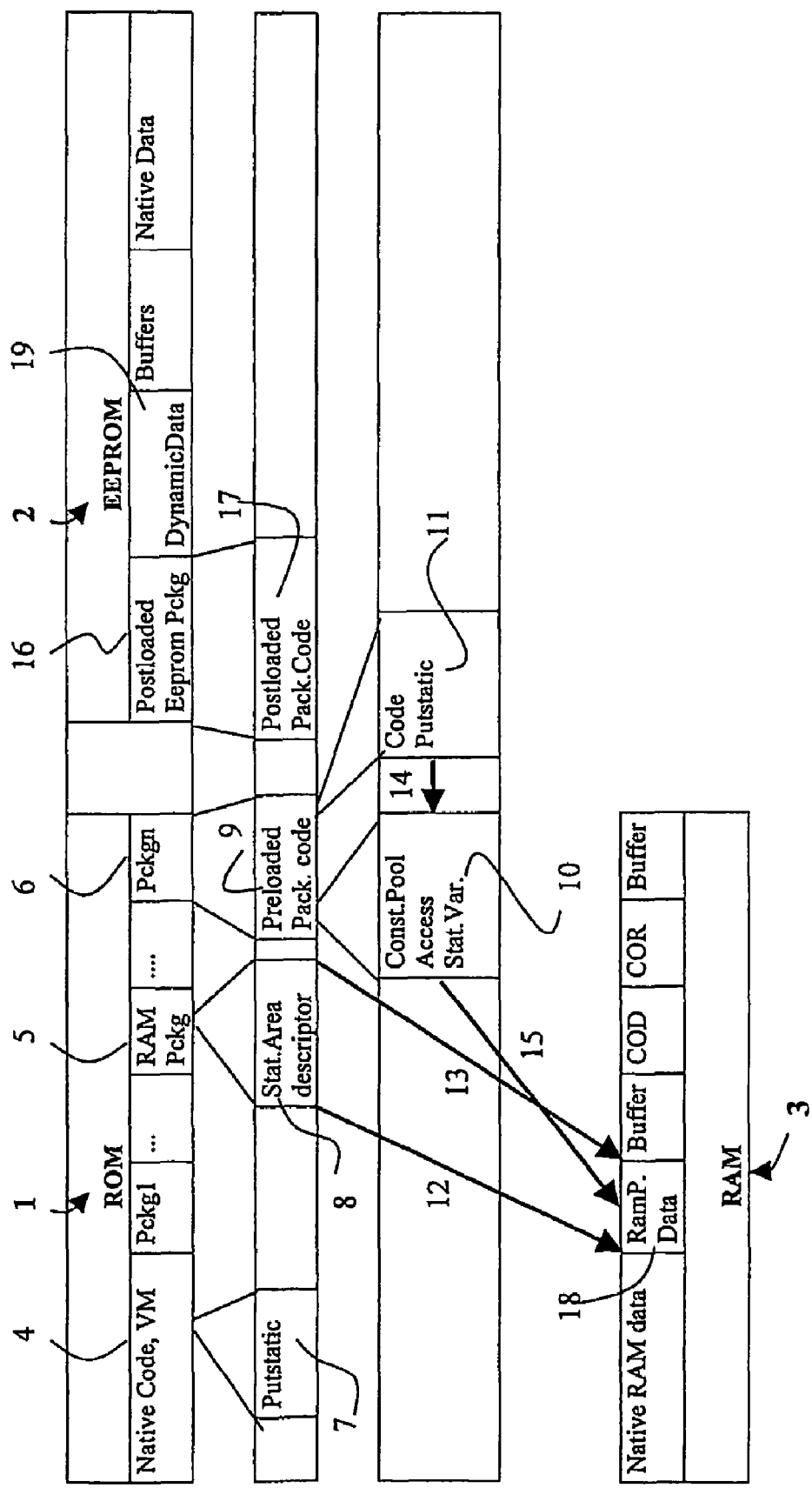
FIG. 1 shows a schematic representation of a Java Card with a RAM package 5 implemented therein by which a variables memory area 18 is reserved statically in the RAM of the Java Card, according to a preferred embodiment of the invention.

The Java Card from FIG. 1 has a nonvolatile system memory 1, namely ROM 1, a nonvolatile application memory 2, namely EEPROM 2, and a volatile working memory 3, namely RAM 3.

In ROM 1 the Java Card Virtual Machine VM 4 and further native code are implemented. Also implemented in ROM 1 are a number of packages Pckg1, Pckg2, . . . Pckgn with different contents, partly system functions and partly applications. Furthermore, ROM 1 has implemented therein the inventive RAM package 5, that is, the Java package by which the variables memory area 18 in RAM is reserved. EEPROM 2 stores a plurality of packages loaded into the Java Card before completion, with applications, namely a plurality of preloaded EEPROM packages 16. Moreover, EEPROM 2 contains a heap memory 19 with dynamic data, a plurality of buffers and an area with native data. RAM 3 contains native RAM data, the variables memory area 18 (RamP. Data) reserved by the RAM package, two buffers, a working memory area that is deleted on demand (COD, Clear On Demand), and a working memory area that is deleted on reset (COR Clear On Reset).

The Virtual Machine VM 4 in FIG. 1 contains for example the commands of the VM 4, such as "putstatic" 7 with which a static variable on the runtime can be changed, as indicated by the enlarged detail 7 of the VM labeled "Putstatic".

In the described example of FIG. 1 there is further an access table (SAT, segment allocation table) implemented in the Java Card, which contains among other things the start addresses of the packages implemented in the Java Card.

The access table SAT contains in particular for the RAM package a static area descriptor 8, i.e. a descriptor 8 (or statement) contained in the RAM package 5 and stating a start and size of a certain address range as the memory area for statically declared (reserved) variables. The descriptor 8 (static area descriptor) contains two partial statements, namely the start address of the address range and the size of the address range. The start address is selected so that the address range determined by the static area descriptor 8 is located in RAM 3 of the Java Card, as indicated by the arrows 12, 13 extending from the descriptor 8 (static area descriptor) to RAM 3. The selection of the start address thus made (i.e. selection of the start address so that the reserved variables memory area is located in RAM) results in access information directed directly to the RAM memory. That the descriptor 8 (static area descriptor) refers to an address statement in RAM is a change over the Java Card VM specification, but it is not externally recognizable.

The package 6 with the number "n" shown in FIG. 1, marked "Pckgn", is a preloaded package, i.e. a package that has been implemented in the Java Card before completion of the Java Card, and contains package code 9 stored in ROM memory 1 of the Java Card, as indicated by the enlarged detail 9 "Preloaded Pack. Code". The package code 9 of the preloaded package 6 in turn contains code for a constant pool 10 ("Const. Pool") and code 11 for the command "putstatic" of the VM. By "put-static" 11 in the code of the preloaded package 6 (Pckgn) a variable of the static type is addressed using the constant pool 10, namely in RAM 3, in the reserved variables memory area 18, as indicated by the arrows 14, 15 extending from "Code put-static" to "Const. Pool . . . " (arrow 14) and from "Const. Pool . . . " to "RamP. Data" (arrow 15). The preloaded package Pckgn 6 was linked by the off-card linker and using the export file of the Java Card. The preloaded package Pckgn 6 was thereby equipped with link information of the RAM package 5, in particular with the address which is in the descriptor 8 for static variables (static area descriptor). This causes the preloaded package Pckgn 6 to have the link information of the RAM package 5. Consequently, the preloaded package Pckgn 6 can use the reserved variables memory area 18 of the RAM package 5, i.e. use inventive global variables (RAM static variables).

In the example from FIG. 1, a postloaded package 16 which is implemented in EEPROM cannot access the variables memory area 18 reserved in RAM 3, so that the postloaded package 16 in EEPROM cannot use any inventive global variables in RAM. Only packages in the system memory ROM can use the global variables in RAM.

According to alternative embodiments, preloaded packages in EEPROM can also use the global variables in RAM. The preloaded packages in ROM then also, like the packages in the system memory ROM, have the address information supplied by the off-card linker in the export file, with which they can link to the reserved variables memory area so that they can use the reserved variables memory area in RAM for variables.

The invention claimed is:

1. A smart card chip, comprising a nonvolatile system memory, a Java Card Virtual Machine implemented in the nonvolatile system memory, a nonvolatile application memory, a volatile working memory and a variables memory area reserved for global variables, the variables memory area being reserved in the volatile working memory;
   wherein the variables memory area is reserved by a Java package implemented in the smart card chip;
   wherein the variables memory area is accessible only by programs stored in the system memory;
   wherein said programs may access the variables memory area that can link to the variables memory area; and
   wherein an export component of the Java package containing the link information required for linking to the reserved variables memory area is not implemented in the smart card chip.

2. The smart card chip according to claim 1, wherein the variables memory area is accessible only by programs that have been implemented in the smart card chip up to the end of completion of the smart card chip.

3. The smart card chip according to claim 1, wherein the variables memory area is reserved statically.

4. The smart card chip according to claim 1, wherein the variables memory area is reserved by access information directed directly to the working memory.

5. The smart card chip according to claim 1, wherein said programs are excluded from using the variables memory area that cannot link to the variables memory area.

6. The smart card chip according to claim 5, including a program having withheld therefrom for linking an export component of the smart card chip to prevent the program to link to the variables memory area.

7. The smart card chip according to claim 1, wherein the Java package is implemented in the system memory.

8. The smart card chip according to claim 1, wherein the Java package contains exclusively the reservation of the variables memory area.

9. The smart card chip according to claim 1, wherein the Java Card Virtual Machine is so formed, and modified when required, that it enables the use of global variables in the volatile working memory on the basis of the variables memory area reserved in RAM.

10. The smart card chip according to claim 9, wherein the Java Card Virtual Machine is modified such that the modifications are not qualitatively recognizable externally.

11. A chip module having a smart card chip according to claim 1.

12. A data carrier having at least one of a smart card chip according to claim 1 and a chip module according to claim 11.

* * * * *